United States Patent

Horikawa et al.

[11] 4,396,036
[45] Aug. 2, 1983

[54] LIQUID PASSAGE SWITCHING DEVICE

[75] Inventors: Hiroshi Horikawa; Yoshiaki Uchida, both of Minami-ashigara, Japan

[73] Assignee: Fuji Photo Film Co., Ltd., Kanagawa, Japan

[21] Appl. No.: 218,133

[22] Filed: Dec. 19, 1980

[30] Foreign Application Priority Data

Dec. 20, 1979 [JP] Japan .................. 54-166233

[51] Int. Cl.³ .............................................. F16K 11/00
[52] U.S. Cl. ........................... 137/625.41; 137/625.21; 137/625.46
[58] Field of Search ...................... 137/625.11, 625.12, 137/625.13, 625.41, 874, 876, 625.21, 625.46

[56] References Cited

U.S. PATENT DOCUMENTS

| 2,871,883 | 2/1959 | Dunlap | 137/625.11 |
| 2,996,083 | 8/1961 | Huska | 137/625.11 |
| 3,116,757 | 1/1964 | Donguy et al. | 137/625.11 |
| 3,369,565 | 2/1968 | Haggard et al. | 137/625.11 |
| 3,520,327 | 7/1970 | Claydon et al. | 137/625.11 |
| 3,570,536 | 3/1971 | Walker | 137/625.11 |
| 3,972,350 | 8/1976 | Pickett | 137/625.11 |
| 4,156,437 | 5/1979 | Chivens et al. | 137/625.41 |
| 4,224,958 | 9/1980 | Kaplan et al. | 137/625.13 |

Primary Examiner—Alan Cohan
Assistant Examiner—John A. Rivell
Attorney, Agent, or Firm—Sughrue, Mion, Zinn, Macpeak and Seas

[57] ABSTRACT

A liquid passage switching device in which switching of a liquid takes place entirely within another liquid so that no bubbles can be entrapped in the liquid while it is being switched between passages. Plural passages are formed in a head one side of which is sealed with a container having ports which allow a first liquid to flow in and out. A generally U-shaped connecting tube is mounted on a supporting plate and ends of the connecting tube are rotatable by the supporting plate along a circle in which the passages in the head are formed. The openings of the connecting tube are engagable with and disengagable from the passage in the head by moving the supporting plate outward, rotating the supporting plate, and then moving the supporting plate back towards the head and engaging the openings of the connecting tube with the desired passages.

7 Claims, 10 Drawing Figures

LIQUID PASSAGE SWITCHING DEVICE

BACKGROUND OF THE INVENTION

The present invention relates to liquid passage switching devices. More particularly, the invention relates to a liquid passage switching device in which the liquid passage switching operation is carried out in a liquid in such a manner as to prevent the mixing of bubbles in the liquid.

In the field of photographic photosensitive material manufacture, it is often necessary to provide for switching of liquid passages to deliver liquids for the preparation of photographic emulsions. In such an operation, it is essential that no bubbles be mixed into the liquids to be delivered because, if only a single bubble is mixed in the prepared photographic emulsion, the bubble will cause a serious defect in quality in the finished photographic product.

However, the above-described requirement is not always satisfied by conventional liquid passage switching devices. In addition, conventional devices are disadvantageous in that bubbles are liable to mix into the liquid to be delivered and it is rather difficult to clean a conventional device.

A liquid passage switching device called "a ball valve" as shown in FIG. 1 is a well-known device of this general type. In this device, the passages 1, 2 and 3 are switched by turning a ball 4 which is rotatably provided in a housing 7 through predetermined angles. The device is disadvantageous in the following points. There are small gaps 5, 5' and 5" between the ball 4 and the housing 7. Therefore, as the ball 4 is turned, the gas contained in the small gaps is brought into the passages 1, 2 and 3 as a result of which the gas is mixed into the liquids. In addition, when the liquids are switched, the remaining old liquid has a tendency to stick to packings 6, 6' and 6" provided in the device making it difficult to sufficiently clean the valve.

Japanese Published Patent Application No. 1089/1975 discloses a liquid passage switching device in which, as shown in FIG. 2, a U-shaped connecting tube 8 is rotatable in the directions of the arrows by an actuator. A plurality of passages 9 whose openings are radially arranged are switched by moving the connecting tube 8 step by step. This conventional device is also disadvantageous in that, as the connecting tube 8 must be disconnected from a passage to switch the passages, the mixing of gases is unavoidably caused as in the above-described device and the liquid can leak to the outside.

Accordingly, an object of the invention is to provide a liquid passage switching device in which all of the abovedescribed drawbacks accompanying a conventional liquid passage switching device have been eliminated, the mixing of gases into the liquid during switching operations is eliminated, and cleaning can be readily achieved.

SUMMARY OF THE INVENTION

The foregoing object and other objects of the invention have been achieved by the provision of a liquid passage switching device in which, according to the invention, the openings of a plurality of passages for a second liquid are provided on an inner wall of a sealed container having flow-in-and-out ports for a first liquid with the openings arranged along the circumference of a circle on the inner wall. The plurality of passages extend outside the container. A U-shaped connecting tube with openings which are equal in diameter to those of the plurality of passages for the second liquid is provided in the sealed container with the openings of the connecting tube engagable with and disengagable from the openins of the plurality of passages for the second liquid and with the connecting tube rotatable along the circumference. With this structure, the passages for the second liquid are switched entirely in the first liquid.

DESCRIPTION OF THE PREFERRED EMBODIMENTS

The invention will be described with reference to preferred embodiments.

Figure 1:
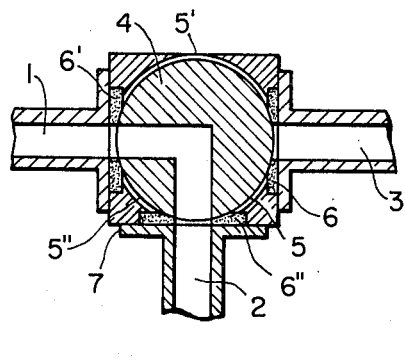
FIGS. 1 and 2 are diagrams showing conventional liquid passage switching devices.
Figure 2:
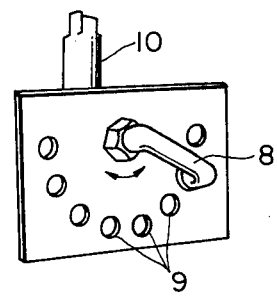
Figure 3:
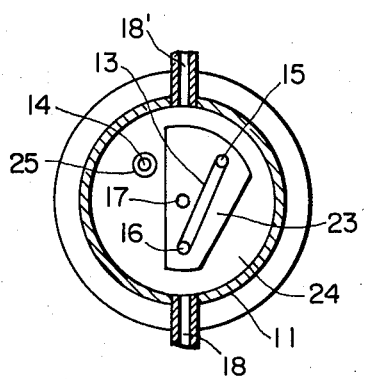
FIG. 3 is a sectional plan view showing a first embodiment of a liquid passage switching device according to the invention.
Figure 4:
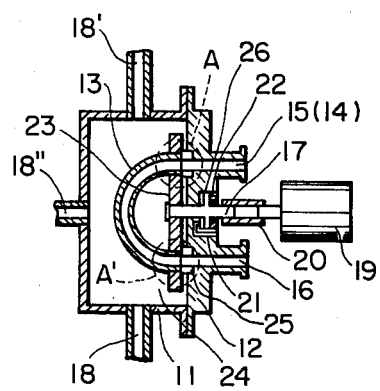
FIG. 4 is a sectional side view of the device in FIG. 3.
Figure 5:
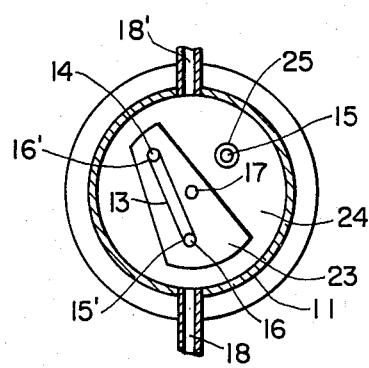
FIGS. 5 and 6 are diagrams for a description of the operation of the device shown in FIGS. 3 and 4.

FIG. 3 is a plan view showing a first preferred embodiment of a liquid passage switching device according to the invention and FIG. 4 is a sectional side view of the device in FIG. 3. In these FIGS. 3 and 4, reference character 11 designates a sealed container having first liquid flow-in-and-out ports 18, 18' and 18" in its walls; 12 a head having a plurality of second liquid passages 14, 15 and 16 which communicate with the exterior of the container; 13 a U-shaped connecting tube the diameter of which is equal to that of the passages 14, 15 and 16; 23 a supporting plate adapted to support the connecting tube 13; 17 a rotary shaft coupling the supporting plate 23 through a coupling 20 to a rotary or torque actuator 19; 21 an air inlet for engaging passage engaging and disengaging sections A and A'; 22 an air inlet for disengaging the passage engaging and disengaging sections A and A' from each other; 24 a first liquid in the sealed container 11; 25 passage opening sealing gaskets; and 26 a piston for carrying out the engagement and disengagement of the passage engaging and disengaging sections A and A'.

The openings of the passages 14, 15 and 16 are provided at constant intervals on a circle with the rotary shaft 17 as its center on the head 12 which forms a part of the inner wall of the sealed container 11. In switching the passage, the supporting plate 23 is disengaged from the head 12 by the operation of the piston 26 and is turned around the rotary shaft 17 by the operation of the torque actuator 19. A rotation angle is preset for the supporting plate 23 so that the plate 23 is turned through an angle corresponding to the positions of the openings of the passages 14, 15 and 16 as desired. After the supporting plate 23 has been turned, the openings of the connecting tube 13 and the openings of the passages 14, 15 and 16 coincide with one another in the passage engaging and disengaging sections A and A' at all times.

The sealed container 11 is fully filled with the first liquid 24 which is supplied through one of the flow-in-and-out ports 18, 18' and 18" with the first liquid 24 being different from a second liquid which is delivered through the connecting tube 13.

The first liquid 24 is supplied into the sealed container so that the passage switching operation is carried out entirely in the first liquid. In practice, the first liquid is chosen such that no problems will result if it is mixed with the second liquid running in the connecting tube 13. For instance, in delivering a photographic emulsion, the emulsion forms the second liquid, and water at a suitable temperature is used as the first liquid.

The operation of the device thus constructed will be described.

It is assumed that the passage switching operation is carried out to change from the state in which the liquid is delivered from the passage 15 to the passage 16 as shown in FIG. 3 or FIG. 4 into the state in which the liquid is delivered from the passage 14 to the passage 16, or vice versa.

Figure 6:
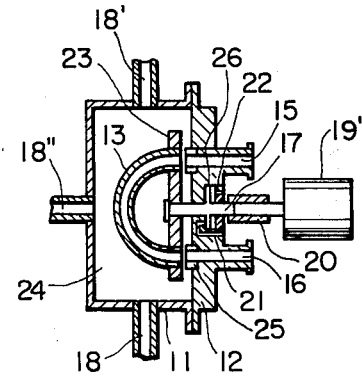

In this operation, first air is supplied to the air inlet 22 from an air supplying source (not shown) to move the piston 26 towards the sealed container 11 thereby to move the supporting plate 23 away from the head 12 as shown in FIG. 6. In this operation, a part of the first liquid 24 in the container enters the connecting tube 13 but, as described above, with proper choice of the first liquid, no problem results the second liquid to be delivered. Then, the torque actuator 19 is operated to turn the supporting plate 23 through the predetermined angle, 120° in this example. After the supporting plate has been turned, air is supplied through the air inlet 21 to move the piston 26 in the opposite direction thereby to again engage the supporting plate 23 with the head 12. As a result, the openings of the connecting tube 13 coincide in position with the openings of the passages 14 and 16 in close contact with the sealing gaskets 25. In this manner, the passage switching operation has been achieved.

The device can be cleaned as follows. A cleaning liquid such as hot water is run in and out of the liquid flow-in-and-out ports 18, 18' and 18" to clean the interior of the container. The cleaning liquid is supplied through the passages 14, 15 and 16, while the supporting plate 23 is repeatedly engaged with and disengaged from the head 12 to clean the connecting tube 13. Thus, the interiors of the container and the connecting tube 13 and the passage engaging and disengaging sections A and A' can be readily and positively cleaned.

As is apparent from the above description, the device of the invention has the following advantages:

(i) As the switching of the second liquid passage is carried out in the first liquid, no air is mixed into the passages during the passage switching operation and accordingly no bubbles are mixed into the second liquid.

(ii) The openings of the passages are equal in diameter to the openings of the connecting tube and the positions of these openings coincide with one another in the passage engaging and disengaging sections positively. Therefore, no dead space is present in the passage engaging and disengaging sections. Accordingly, the liquid to be delivered has no place to adhere to in the passages or in the passage engaging and disengaging sections.

(iii) The passages can be cleaned merely by repeatedly causing the supporting plate to engage with and disengage from the head with cleaning liquid supplied into the passages. Therefore, cleaning operations can be achieved readily and positively.

While the invention has been described with reference to a first preferred embodiment, it is not limited thereto and thereby. For instance, the passage openings and connecting tubes may be constructed as shown in FIG. 7 or 8, if desired.

Figure 7:
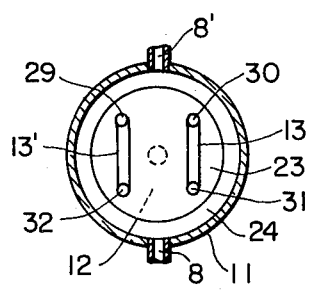
FIGS. 7 through 9 are sectional plan views of second through fourth embodiments of a device according to the invention which are modifications of the device shown in FIGS. 3 and 4.
Figure 8:
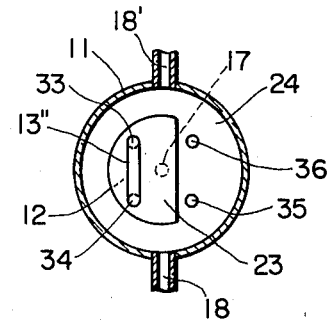

FIG. 7 shows a second preferred embodiment of a device according to the invention. In the device shown in FIG. 7, four passage openings 29, 30, 31 and 32 are arranged on a circle on the head 12 and two connecting tubes 13 and 13' are supported on the supporting plate 23. The supporting plate 23 is turned to change from the state in which the passages 29 and 30 are coupled to the passages 32 and 31 respectively to the state in which the passages 29 and 31 are coupled to the passages 30 and 32 respectively, and vice versa. FIG. 8 shows a third embodiment of the device according to the invention, which is obtained by removing one of the connecting tubes from the device of FIG. 7. This embodiment of a liquid passage switching device has the advantage that, while the liquid is being delivered through one series of passages 33 and 34, the interior of the container can be cleaned by supplying cleaning liquid thereinto through the other series of passages 35 and 36.

Figure 9:
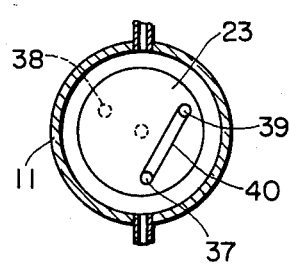

FIG. 9 shows a fourth embodiment of a device according to the invention in which a passage 38 can be sealed with the supporting plate 23 when it is not used to deliver the liquid.

In the above-described embodiments, the connecting tube is U-shaped. However, a variety of connecting tubes of different configurations, for instance a V-shaped connection tube, can be employed.

As described in detail, the invention has significant advantages that during switching operations, the mixing of bubbles into the liquid to be delivered is prevented and the device can be readily and positively cleaned. This will become more apparent from a description of the following specific example.

EXAMPLE

Figure 10:
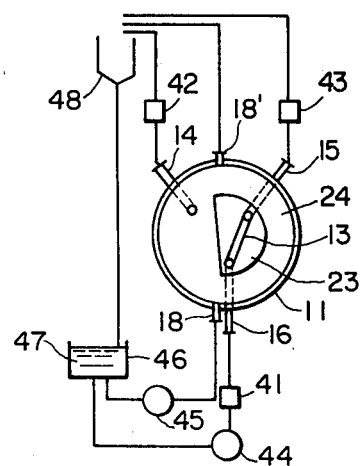
FIG. 10 is an explanatory diagram showing the device of FIG. 3 connected to a test apparatus.

A liquid passage switching device as shown in FIGS. 3 and 4 was connecting in an experimental system as shown in FIG. 10. The device was operated with water as both the first and second liquids to detect the mixing conditions of bubbles with bubble detectors.

In FIG. 10, reference numerals 41, 42 and 43 designate the bubble detectors; 46 and 48 tanks; 44 and 45 liquid delivering pumps; and 47 the water to be delivered through the connecting tube 13. In this system, the water 47 in the tank 46 is moved to the upper tank 48 by the pumps 44 and 45 and is then returned to the original tank 46 with this operation being repeatedly carried out. More specifically, the water 47 supplied by the pump 44 is delivered through the bubble detector 41, the passage 16, the connecting tube 13, the passage 15 and the bubble detector 43 to the tank 48, where it is stored. During this operation, the water is run through the passage 14 and the bubble detector 42 into the tank 48 by the switching operation of the connecting tube 13. The water 47 is supplied into the sealed container 11 through the passage 18 in such a manner that the container 11 is maintained filled with water. In the liquid delivering system thus constructed, several flow rates were used with the pumps 44 and 45 to deliver the water 47. After it was confirmed with the bubble detectors 41, 42 and 43 that no bubbles were contained in the flows of water which ran separately, the connecting tube 13 was switched, with the results as indicated in the following Table 1:

TABLE 1

| Test No. | Flow rate | | Number of detected bubbles | | |
|---|---|---|---|---|---|
| | Pump 44 | Pump 45 | Detector 41 | Detector 42 | Detector 43 |
| 1 | 6 l/min | 6 l/min | 0 | 0 | 0 |
| 2 | 2 l/min | 6 l/min | 0 | 0 | 0 |
| 3 | 2 l/min | 2 l/min | 0 | 0 | 0 |

As is clear from Table 1, it has been confirmed that, with the switching device of the invention, no bubbles are mixed into the liquid being conveyed even when the passage switching operation is carried out.

What is claimed is:

1. A liquid passage switching device comprising:
a container having ports adapted for allowing a first liquid to flow in and out;
a head sealed to said container, said head having a plurality of passages for delivering a second liquid, said plurality of passages opening along the circumference of a circle and debouching into said container, said openings communicating outside of said sealed head and container; and
a generally U-shaped connecting tube having openings equal in diameter to those of said passages, said connecting tube being rotatable in such a manner that the openings of said connecting tube are engagable with and disengagable from those of said passages along said circumference of a circle to interconnect a selected pair of said passages delivering said second liquid, said container being filled with said first liquid at least to a level above a level of said passages and said openings so that said U-shaped tube can be switched between selected pairs of said passages with said openings being entirely surrounded by said first liquid.

2. A liquid passage switching device comprising:
a container having ports adapted for allowing a first liquid to flow in and out;
a head sealed to said container, said head having a plurality of passages for delivering a second liquid, said plurality of passages having openings located in a common plane with centers of all said openings being along the circumference of a circle and debouching into said container, said openings communicating outside of said sealed head and container; and
a generally U-shaped connecting tube having openings equal in diameter to those of said passages, said connecting tube being rotatable in such a manner that the openings of said connecting tube are engagable with and disengagable from those of said passages along said circumference of a circle to interconnect a selected pair of said passages delivering said second liquid, said container being filled with said first liquid at least to a level above a level of said passages and said openings so that said U-shaped tube can be switched between selected pairs of said passages with said openings being entirely surrounded by said first liquid.

3. The liquid passage switching device of claim 2 further comprising a supporting plate for supporting said U-shaped connecting tube, said supporting plate being rotatably mounted around the center of said circle.

4. The liquid passage switching device of claim 3 wherein said supporting plate extends to cover ones of said passages not connected to said connecting tube.

5. The liquid switching device of claim 3 wherein said supporlting plate leaves open ones of said passages not connected by said connecting tube.

6. The liquid passage switching device of claim 3 further comprising a rotary shaft coupled to said supporting plate for rotatably supporting said supporting plate around said center of said circle and for moving said supporting plate away from and towards said head; a torque actuator coupled to said rotary shaft for rotating said supporting plate through a predetermined angle; and piston actuator means coupled to said rotary shaft for moving said rotary shaft to move said supporting plate away from and towards said head.

7. The liquid passage switching device of any one of claims 1, 3, 6 and 2 wherein at least four of said passages are provided and further comprising at least a second U-shaped connecting tube having openings equal in diameter to those of said passages, said second connecting tube being rotatable in such a manner that the openings of said second connecting tube are engagable with and disengagable from those of said passages to switch said passages delivering said second liquid, said second connecting tube being connected at any one rotary position to different ones of said passages than said first-mentioned connecting tube.

* * * * *